US012092133B2

(12) United States Patent
Brenne

(10) Patent No.: US 12,092,133 B2
(45) Date of Patent: Sep. 17, 2024

(54) GAS COMPRESSOR CLEANING

(71) Applicant: Equinor Energy AS, Stavanger (NO)

(72) Inventor: Lars Brenne, Sandnes (NO)

(73) Assignee: Equinor Energy AS, Stavanger (NO)

( * ) Notice: Subject to any disclaimer, the term of this patent is extended or adjusted under 35 U.S.C. 154(b) by 212 days.

(21) Appl. No.: 17/620,847

(22) PCT Filed: May 29, 2020

(86) PCT No.: PCT/NO2020/050143
§ 371 (c)(1),
(2) Date: Dec. 20, 2021

(87) PCT Pub. No.: WO2020/256560
PCT Pub. Date: Dec. 24, 2020

(65) Prior Publication Data
US 2022/0341440 A1 Oct. 27, 2022

(30) Foreign Application Priority Data
Jun. 21, 2019 (GB) ..................................... 1908908

(51) Int. Cl.
*F04D 29/70* (2006.01)
*B08B 3/02* (2006.01)
(Continued)

(52) U.S. Cl.
CPC .............. *F04D 29/705* (2013.01); *B08B 3/02* (2013.01); *B08B 3/04* (2013.01); *B08B 9/032* (2013.01);
(Continued)

(58) Field of Classification Search
CPC .... F04D 29/705; F04D 29/701; F04D 29/706; F04D 31/00; B08B 3/02; B08B 3/04; B08B 9/032; F17D 1/005; E21B 43/34
See application file for complete search history.

(56) References Cited

U.S. PATENT DOCUMENTS

2009/0050326 A1* 2/2009 Grynning .................. B08B 9/00 166/312
2012/0103188 A1* 5/2012 Stinessen ................ F04D 31/00 96/195
(Continued)

FOREIGN PATENT DOCUMENTS

CN 102428249 A 4/2012
CN 204564682 U 8/2015
(Continued)

OTHER PUBLICATIONS

Jul. 14, 2020—(WO) International Search Report and Written Opinion—APP PCT/NO2020/050143.
(Continued)

*Primary Examiner* — Sabbir Hasan
*Assistant Examiner* — Andrew J Marien
(74) *Attorney, Agent, or Firm* — Banner & Witcoff, Ltd.

(57) ABSTRACT

A method and corresponding gas processing system for cleaning deposited solid material from a fouled portion of a gas compressor whilst the gas compressor is in situ in a natural gas processing system are provided. Cleaning of a gas compressor is achieved by accumulating liquid removed from cooling gas used for cooling the gas compressor and supplying the accumulated liquid to an inlet of the gas compressor in order to remove deposited solid material from the gas compressor. The cooling gas is extracted from an intermediate stage of the gas compressor.

13 Claims, 2 Drawing Sheets

(51) Int. Cl.

| | |
|---|---|
| ***B08B 3/04*** | (2006.01) |
| ***B08B 9/032*** | (2006.01) |
| ***E21B 43/34*** | (2006.01) |
| ***E21B 43/36*** | (2006.01) |
| ***F04D 17/12*** | (2006.01) |
| ***F04D 31/00*** | (2006.01) |
| ***F17D 1/00*** | (2006.01) |

(52) U.S. Cl.
CPC .............. *E21B 43/34* (2013.01); *E21B 43/36* (2013.01); *F04D 17/12* (2013.01); *F04D 29/701* (2013.01); *F04D 29/706* (2013.01); *F04D 31/00* (2013.01); *F17D 1/005* (2013.01)

(56) References Cited

U.S. PATENT DOCUMENTS

| | | | | |
|---|---|---|---|---|
| 2012/0195740 | A1* | 8/2012 | Karishuku ............ | F04D 29/701 415/169.2 |
| 2015/0167681 | A1* | 6/2015 | Brenne ................. | B08B 9/0328 134/22.12 |
| 2016/0290366 | A1 | 10/2016 | Brenne et al. | |
| 2019/0374979 | A1* | 12/2019 | Brenne ..................... | B08B 3/04 |

FOREIGN PATENT DOCUMENTS

| | | | |
|---|---|---|---|
| DE | 102008064117 | A1 | 5/2009 |
| JP | H04350388 | A | 12/1992 |
| JP | 2001246334 | A | 9/2001 |
| WO | 0175310 | A1 | 10/2001 |
| WO | 2007004886 | A1 | 1/2007 |
| WO | 2013185801 | A1 | 12/2013 |
| WO | 2018135955 | A1 | 7/2018 |

OTHER PUBLICATIONS

Dec. 10, 2019—(GB) Combined Search and Exam Report—APP 1908908.5.

Brenne, Kibsgaard, and BJørge, Cooling arrangement for a wellstream compressor, Research Disclosure, Dec. 2018.

Feb. 14, 2023 (CN) Office Action Chinese Application No. 202080046008.5.

* cited by examiner

GAS COMPRESSOR CLEANING

The present application claims priority from and is a U.S. National Phase of International Application No. PCT/NO2020/050143, which was filed on May 29, 2020, designating the United States of America and claiming priority to United Kingdom Patent Application No. 1908908.5, filed on Jun. 21, 2019. This application claims priority to and the benefit of the above-identified applications, which are all fully incorporated by reference herein in their entireties.

The present invention relates to cleaning of a gas compressor, in particular cleaning of a gas compressor to remove the type of fouling deposited during the processing of natural gas.

In the oil and gas industry, gas compressors are used during the processing of well fluids to compress the gas to help transport the well fluid from one location to the next. Indeed, it can be necessary to use gas compressors to achieve a sufficiently high rate of production from the well.

In multiphase fluid processing, it is common to remove as much liquid as possible from the gas before the gas is passed through the compressor and compressed. This is because liquid passing through the compressor can cause damage or fouling of the compressor. Processing components located upstream of the compressor may be used to try to reduce or minimise the liquid content in the gas before it reaches the compressor. For example, a multiphase flow may be separated into gas and liquid in a separator.

Separation of the gas upstream of the compressor is usually imperfect, such that the gas entering the compressor contains some liquid or moisture in very small quantities. High temperatures inside the compressor can cause the liquid entrained in the gas to vaporize resulting in deposition of solid materials, such as salts and scale, on surfaces inside the compressor. Often, glycol is added to natural gas during transit from the wellhead to a gas processing facility, and glycol salts are a particularly common form of fouling that occurs in compressors in natural gas processing systems. Solid deposits can detrimentally affect compressor performance and reduce the life time of the compressor.

The most commonly used technique for cleaning a compressor is offline cleaning. The processing system including the gas compressor is shut down and the compressor is physically removed, sent for cleaning and then replaced. For large compressors, this operation can take up to a week, during which time the entire processing system is non-operational. In inaccessible locations, such as subsea or unmanned platforms, offline cleaning can take even longer and is some cases may not be feasible at all.

Online cleaning solutions for compressors have been proposed, such as periodically adding a small quantity of solvent to the gas that is being compressed. An example of such a system is disclosed in WO 2007/004886. The solvent additive passes through the compressor with the gas to clean the interior surfaces. Permanent nozzles and piping systems may be attached to the compressor for supplying this solvent, which increase manufacturing costs and mean that such systems cannot be easily retrofitted. Furthermore, the use of a dedicated cleaning solvent may be costly and may have environmental drawbacks. It may also upset the chemical balance of downstream processing stages.

Another online cleaning solution has been proposed in WO 2013/185801 where a liquid phase stream from downstream of the separator or the multi-phase stream from upstream of the separator are supplied to the compressor inlet so that a large quantity of hydrocarbon liquid is pumped through the compressor. This has been found to clean the compressor to an adequate degree.

A further online cleaning solution is discussed in WO 2018/135955 in which a compressed hydrocarbon stream from downstream of the compressor is cooled and separated into liquid and gaseous hydrocarbon phases, with the liquid hydrocarbon phase being returned to the inlet of the separator to be passed through the compressor to initiate cleaning. However, this technique can necessitate an increase in the size and complexity of the infrastructure of the gas processing system.

A need therefore exists for improved techniques for gas compressor cleaning to remove deposits.

Viewed from a first aspect, the invention provides a method of cleaning deposited solid material from a fouled portion of a gas compressor whilst the gas compressor is in situ in a gas processing system, the method comprising: supplying a fluid to an inlet of the gas compressor; extracting a portion of the fluid from an intermediate stage of the gas compressor, wherein a gas phase of the extracted portion of the fluid is used for cooling within the gas processing system; accumulating a liquid phase of the extracted portion of the fluid; and supplying the accumulated liquid phase to the inlet of the gas compressor during a cleaning operation so as to remove the deposited solid material from the compressor.

It has been found that adding a relatively small amount of liquid to the fluid steam input to a gas compressor can effectively remove accumulated solids within the compressor without damaging the gas compressor. This can result in a significant increase in performance of the gas compressor, as compared to when fouling is present. The removed solids are then expelled within the fluid that is output from the gas compressor.

In accordance with this method, a portion of the fluid passing through the gas compressor is extracted from an intermediate stage of the compressor to be used for cooling. The fluid in the intermediate stage may contain a small quantity of liquid, and this is accumulated to provide the liquid for cleaning the gas compressor. The remaining portion of the fluid that is not extracted from the intermediate stage of the compressor continues to pass through the gas compressor and is output from the gas compressor as a compressed fluid. A liquid phase is obtained from the extracted fluid and supplied to the inlet of the gas compressor to remove the deposited solids.

This method utilises the fluid stream supplied to the compressor to clean the gas compressor. Therefore, it is not necessary to supply the gas processing system with a dedicated supply of compressor cleaning fluid.

Preferably, during normal operation, a liquid content in the fluid at the gas inlet to the gas compressor is below 5 wt. %, more preferably below 3 wt. % and yet more preferably below 1 wt. %. Normal operation of the gas processing system shall be taken to mean the period of operation where cleaning of the gas compressor does not occur.

Preferably, during a cleaning operation, a liquid content in the fluid at the inlet to the gas compressor more than 10 wt. %, more preferably more than 20 wt. %, and yet more preferably more than 60 wt. %.

Preferably, the processing system is a natural gas processing system. Thus, the fluid supplied to the inlet of the gas compressor may comprise hydrocarbons. The fluid may comprise at least 50 vol. % alkenes, preferably at least 80 vol. % alkanes. In some hydrocarbon gas processing systems, the fluid comprises at least 95 vol. % alkanes. In such systems, the fluid may comprise substantially alkanes together with unavoidable impurities.

Where the fluid comprises hydrocarbons, the liquid phase may comprise a hydrocarbon liquid, such as a liquid alkane. Hydrocarbon liquids are efficient at removing deposited solids and may advantageously also partially dissolve the deposited solids.

The gas phase may be used to cool one or more heat generating component(s) of the gas compressor. The compressor may comprise heat generating components, such as a motor and bearings. The motor may be an electric motor. The gas phase may be directed to the compressor to cool these components and prevent overheating. When used for cooling, the gas phase will cool the heat generating components, and will be subsequently heated. After being used for cooling, the heated gas phase may be recycled to the inlet of the gas compressor.

Supplying the liquid phase to the inlet of the gas compressor may preferably comprise mixing the liquid phase with the heated gas phase being recycled to the inlet of the gas compressor. The liquid phase will become entrained in the gas phase and will pass, along with the gas, to the inlet of the compressor. Alternatively, the liquid phase may be supplied to the inlet of the gas compressor separately to the heated gas phase.

Supplying the liquid phase to the inlet of the gas compressor may comprise mixing the liquid phase with the fluid being supplied to the inlet of the compressor. The liquid phase will mix with the fluid and pass to the inlet of the compressor.

The extracted fluid may be supplied to a separator to separate the extracted fluid into the gas phase and the liquid phase. Preferably, the liquid phase is accumulated in the separator. Since the separator is used to separate the extracted fluid into a liquid phase and a gas phase, and also as a vessel for accumulating the liquid phase there is no need to provide a dedicated accumulation or storage vessel for accumulating the liquid phase.

The step of accumulating the liquid phase may comprise restricting a flow of the liquid phase in a liquid outlet of the separator. The restriction limits the liquid flow rate through the liquid outlet of the separator, thereby causing the liquid phase to accumulate, or collect, within the separator. Liquid may preferably be prevented from exiting the separator via the liquid outlet. This increases the rate at which the liquid phase can be accumulated in the separator.

In one embodiment, the flow of the liquid phase thorough the liquid outlet may comprise at least partially closing, i.e. fully closing or partially closing, a drain valve in the liquid outlet of the separator. The drain valve may be capable of being fully closed, fully opened, and partially closed. That is to say the drain valve may have one or more intermediate states between fully open and fully closed. The drain valve may be a discrete variable drain valve such that the degree at which the drain valve is opened, between fully opened and fully closed, may be varied in a discrete manner. That is to say, the degree of opening may be selected from a limited number of alternatives. Alternatively, the drain valve may be a continuously variable drain valve such that the degree at which the drain valve is opened, between fully opened and fully closed, may be continuously varied. This allows more accurate control over the flow of liquid phase supplied to the inlet of the gas compressor.

When the drain valve is fully closed, fluid is prevented from leaving the separator through the liquid outlet, causing fluid to collect in the separator. When partially closed, the drain valve acts to restrict the flow rate of fluid flowing through the valve. Therefore, the drain valve may be partially closed so as to cause the liquid phase to accumulate within the separator. When the drain valve is partially closed, a portion of the liquid phase may egress from the separator. Thus, when the drain valve is partially closed, the liquid phase may accumulate at a reduced rate compared to when the drain valve is fully closed.

Preferably, the gas processing system is operable when the drain valve is closed or partially closed. Furthermore, the gas processing system is preferably normally operated with the drain valve closed or partially closed. That is to say, the liquid phase is preferably accumulated during normal operation.

Supplying the liquid phase to the inlet of the gas compressor may comprise allowing the liquid phase to flow through a liquid outlet of the separator such that the volume of liquid phase in the separator decreases. Preferably, supplying the liquid phase comprises opening a drain valve in the liquid outlet of the separator.

The method may further comprise monitoring the volume of the liquid phase accumulated in the separator. The efficiency of the separator to separate the gas phase and the liquid phase may be reduced if the volume of liquid accumulated becomes too great and the air space above the liquid level becomes too low. Therefore, to ensure the separator does not fail, the volume of liquid in the separator is measured and monitored. A differential pressure transmitter or float sensor may be used to measure the volume of liquid in the separator.

Liquid may be drained from the separator if the volume accumulated reaches or exceeds a predetermined maximum value. The predetermined maximum value may be at least 500 litres, and may be between 500 litres and 1000 litres. Draining the liquid from the separator may comprise opening a drain valve in the liquid outlet of the separator.

The extracted fluid may be cooled before it is supplied to the separator. By cooling the extracted fluid, additional liquid may condense from the extracted fluid. Thus, the separation efficiency of the separator can be increased and the liquid phase may be accumulated at a greater rate.

The pressure of the extracted fluid may be reduced before it is supplied to the separator. Reducing the pressure of the extracted fluid may causes a Joule-Thomson cooling effect resulting in additional liquid condensing from the extracted fluid. Thus, the separation efficiency of the separator may be increased and the liquid phase may be accumulated at a greater rate. The pressure of the extracted fluid may be reduced by 200 kPa to 600 kPa. This may cause the temperature of the extracted fluid to fall by 1° C. to 3° C.

The method of cleaning may be a method of online cleaning. That is to say, the process can be performed without shutting down production.

Preferably, a cleaning operation is performed for a limited period of time. The limited period of time is preferably less than a day, more preferably less than four hours, more preferably less than one hour, more preferably less than 30 minutes, and most preferably less than 10 minutes.

Preferably, after the limited period of time, the gas processing system resumes normal operation.

The method preferably comprises determining the presence or potential presence of a deposit of solid material on the gas compressor, wherein the supplying is preferably performed responsive to said determination. The determination may be performed during normal operation of the gas compressor. For example, operation preferably does not need to be stopped to perform the determination.

The method may comprise measuring a property of a fluid at the inlet and/or at the outlet of the gas compressor, preferably during normal operation of the gas compressor. The measured property of the fluid may be used to identify a presence or possible presence of the deposit.

The detecting may comprise identifying a changed performance of the compressor, said changed performance being suggestive of a need for cleaning.

The detecting may comprise comparing a measured property of said fluid or a performance of the gas compressor with a reference value.

Viewed from a second aspect, the invention provides a gas processing system, comprising: a gas compressor including an inlet and an outlet; a separator configured to receive a fluid extracted from an intermediate stage of the gas compressor and to separate the extracted fluid into a gas phase and a liquid phase, the separator having a gas phase outlet and a liquid phase outlet; a liquid phase supply line fluidly connecting the liquid phase outlet of the separator to the gas inlet of the gas compressor; and a drain valve arranged in the liquid phase outlet of the separator to control a flow of the liquid phase through the liquid phase supply line, wherein when the drain valve is at least partially closed the liquid phase accumulates in the separator.

The separator may be configured to continuously receive a fluid extracted from the intermediate stage of the gas compressor.

Preferably, the gas processing system is a natural gas processing system.

The gas processing system may comprise a gas phase supply line for supplying the gas phase from the separator to one or more heat generating component(s) of the gas compressor. Thus, the gas phase may be utilised to cool the heat generating components of the compressor, for example a motor and/or bearings of the compressor. This avoids the need for a dedicated supply of cooling fluid to cool the compressor.

The gas processing system may comprise a gas phase return line for supplying gas from the one or more heat generating component(s) of the gas compressor to the inlet of the gas compressor.

The liquid phase supply line may be fluidly connected to the gas phase return line such that liquid phase output from the separator may be supplied to the inlet of the gas compressor via the gas phase return line.

The gas processing system may comprise a cleaning fluid supply line for supplying a cleaning fluid to the separator. The cleaning fluid supply line enables a cleaning fluid to be added to the separator, for example if the volume of the liquid phase in the separator is insufficient to perform a cleaning operation of the compressor. That is to say, the cleaning fluid supply line connects the separator to an alternative source of cleaning fluid.

Wherein the separator comprises a perforated baffle plate to isolate a gas phase from a liquid phase within the separator. The baffle plate may improve separation of the liquid and gas phases within the separator.

The gas processing system may comprise a cooler arranged between the intermediate stage of the compressor and an inlet of the separator. The cooler may cool a fluid from the intermediate stage of the compressor to cause liquids to condense. The cooler means that more liquid will be present in the fluid entering the separator downstream of the cooler, causing the liquid phase to accumulate at a greater rate.

A pressure reducing valve may arranged between the intermediate stage of the compressor and the inlet of the separator. The valve may reduce the pressure of a fluid from the intermediate stage of the compressor and cause the fluid to cool. The pressure reduction may cause a Joule-Thomson cooling effect in the fluid, resulting in additional liquid condensing from the fluid. Accordingly, the liquid phase will be accumulated in the separator at a greater rate. The valve may be configured to reduce the pressure of the fluid by 200 kPa to 600 kPa.

Preferably the gas processing system is operable when the drain valve is closed or partially closed. Moreover, the gas processing system is preferably configured to be normally operable with the draining valve closed or partially closed, i.e. when not in the cleaning mode. That is to say, the liquid phase is preferably accumulated in the separator during normal operation.

An embodiment of the invention will now be described, by way of example only, with reference to the following figures, in which.

Figure 1:
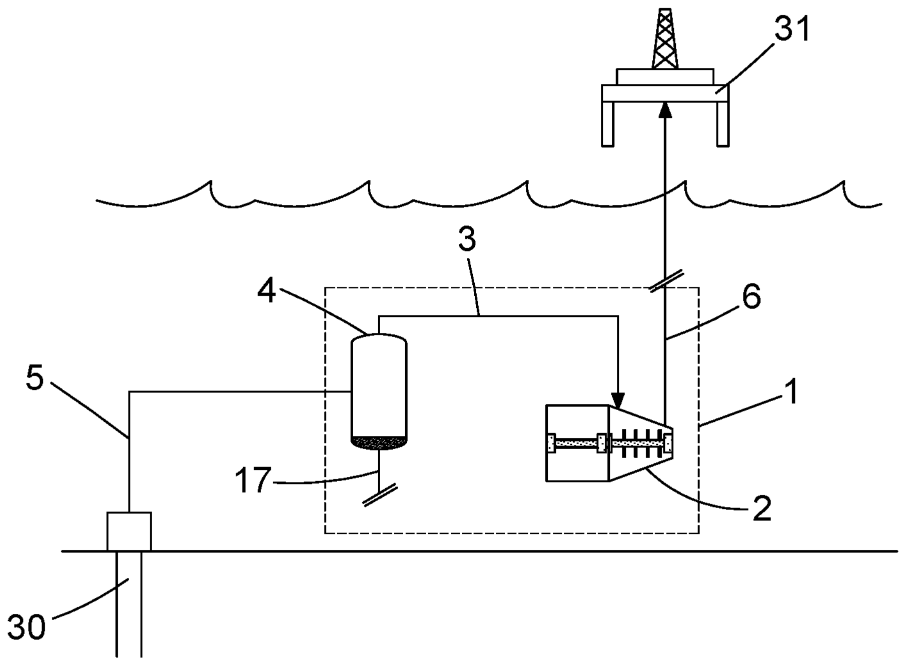
FIG. 1 shows an exemplary fluid processing system.

With reference to FIG. 1, there is shown a part of a fluid processing system 1 for processing fluids from one or more production wells 30. In hydrocarbon wells, this fluid will usually include a mixture of liquid hydrocarbons, gaseous hydrocarbons, water and various impurities, such as acid/sour gases. Commonly, hydrate inhibitors such as glycols are also injected into the fluid close to the production well to prevent gas hydrate formation.

Figure 2:
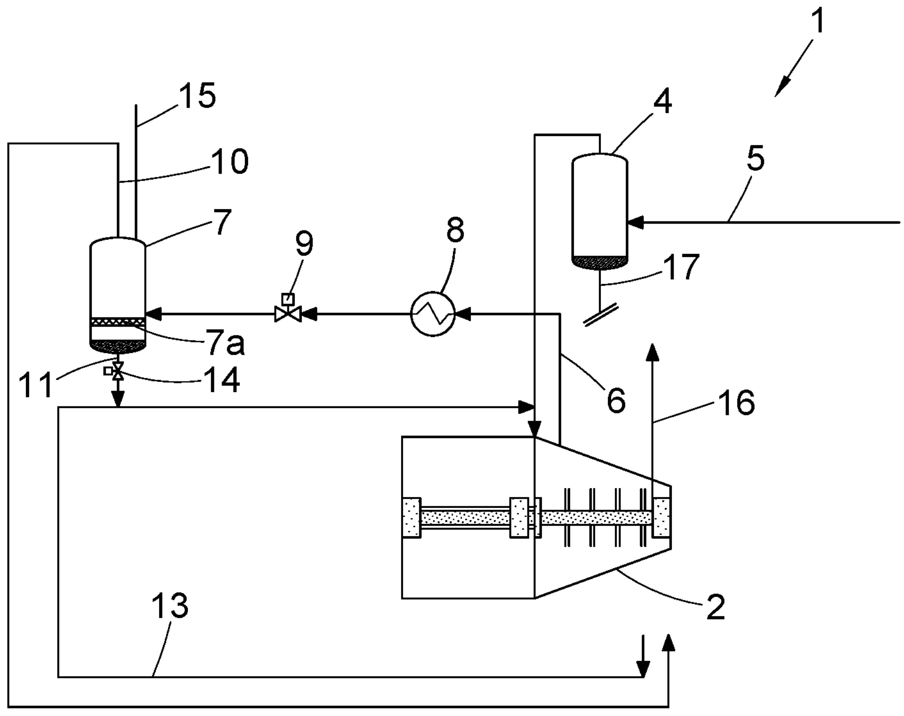
FIG. 2 is a detailed diagram showing part of the fluid processing system.

As shown in FIG. 1, and in more detail in FIG. 2, the fluid processing system 1 comprises a first separator 4 configured to receive the multiphase fluid from the production well via an inlet conduit 5 to the system 1. The multiphase fluid comprises a mixture of liquid and gas. The first separator 4 acts to separate the mixture of gas and liquid received from the conduit 5 into a gas stream 3 and a liquid stream 17.

The liquid stream 17 from the separator 4 will usually comprise a mixture of liquid water and liquid phase hydrocarbons 4, and may be processed in any suitable manner. Often, the liquid water and liquid hydrocarbons are separated, with the liquid water being re-injected into the well, and the liquid phase hydrocarbons being pumped to a processing plant for further refinement.

The fluid processing system 1 includes a compressor 2 through which the gas stream 3 from the separator 4 is passed. The compressor 2 operates to compress the gas stream 3 to facilitate transport of the gas stream 3 onward for further processing downstream of the compressor 2, for example at a topside processing facility 31. The compressor 2 has an inlet 2*a* for intake of the gas stream 3 to be compressed, and an outlet 2*b* fluidly connected to the inlet 2*a* to output a compressed gas stream 16.

If a liquid content in the multiphase fluid from the one or more production wells 30 is below a predetermined threshold value then it may not be necessary to separate multiphase fluid into separate liquid and gas phases using the first separator 4. Below the predetermined threshold value, the content of liquid in the multiphase fluid may be such that an acceptable level of compressor fouling occurs during normal operation of the processing system 1 without the use of a first separator 4. The predetermined threshold value may be such that additional separation of the multiphase fluid into its constituent liquid and gas phases would not substantially reduce the liquid content in the gas phase, for example due to imperfect separation in the first separator 4. The threshold value may be a liquid content of 5 wt. %, 3 wt. % or 1 wt. %. In such a case, the multiphase fluid may be directed to bypass the first separator 4 and flow directly to the inlet 2*a* of the separator 2. Alternatively, the first separator 4 may be absent from the processing system 1 and the inlet conduit 5 may pass fluid directly to the inlet 2*a* of the compressor 2.

In FIG. 1, the processing system 1 is shown in the context of an offshore hydrocarbon production facility. In this example, the processing system 1 is arranged subsea to process produced fluid received from a subsea production well 31 before passing at least the hydrocarbon gases to a topside facility 31 for further processing. However, it should be noted that the disclosed fluid processing system 1 may be used in any hydrocarbon production plant, either offshore or onshore, and may be situated subsea or topside. The fluid processing system 1 may prove especially advantageous if used as part of a remote or unmanned hydrocarbon production plant.

Whilst, in FIG. 1, the processing system 1 is shown directly connected to the one or more production wells 30 by inlet conduit 5, the processing system 1 may be located a distance away from the one or more production wells 30, for example with other processing equipment situated in the flowpath of the fluid flowing between the production wells 30 and the processing system. That is, the processing system 1 may not be directly connected to the one or more production wells 30.

Figure 3:
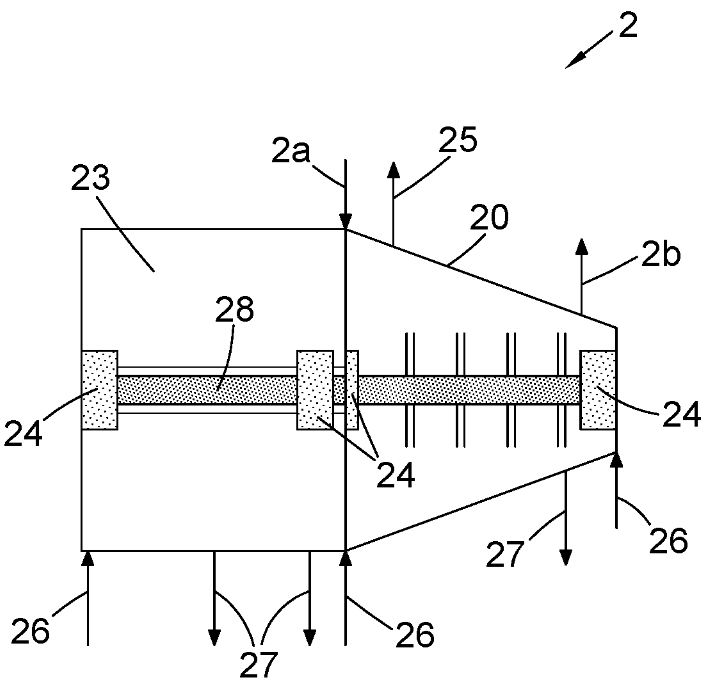
FIG. 3 illustrates an exemplary gas compressor for use in the fluid processing system.

With reference to FIG. 3, the compressor 2 comprises a compressor housing 20 defining a compression path extending between the inlet 2*a* of the compressor 2 and the outlet 2*b* of the compressor 2. During normal operation, the gas stream 3 is passed into the inlet 2*a* of the compressor 2, through the compression path, where it is compressed by one or more working elements 22 of the compressor 2, and out of the outlet 2*b* of the compressor 2 as a compressed gas stream 16.

In the present embodiment, the compressor 2 is a multiphase centrifugal compressor comprising a plurality of impellers 22 driven by an electric motor 23. The impellers 22 are mounted to a rotor shaft 28 that is held in place within the housing 20 of the compressor 2 by bearings 24 which allow the rotor shaft 28 and impellers 22 to rotate relative to the housing 20. The electric motor 23 may also be arranged within the housing 20 of the compressor 2. It should be noted that although a multi-phase centrifugal compressor 2 is used in the present embodiment, the invention is not limited thereto, and any suitable compressor 2 may be used.

During operation of the compressor 2, heat is generated by various components of the compressor 2, particularly in the electric motor 23 and in the bearings 24. To cool these heat-generating components, the fluid processing system 1 is provided with a cooling apparatus to direct cooling gas to the motor 23 and the bearings 24. A portion of the fluid that is being compressed by the compressor 2 is used to provide this cooling gas.

With reference to FIG. 2, the cooling apparatus has a supply line 6 configured to extract a proportion of the fluid from an intermediate stage of the compressor 2 via an intermediate outlet 25 in the housing 20 of the compressor 2 (see FIG. 3).

It is important to avoid liquid in the cooling gas. This is because the presence of liquid may cause ground faults in the electronic components, e.g. in the electric motor 23, and may cause corrosion or other damage to the components within the housing 20. Such liquid may also cause hydrates to form within the conduits of the cooling apparatus which could clog the conduits. Therefore, the extracted fluid is passed by the supply conduit 6 to a second separator 7 where it is separated into a gas phase and a liquid phase. The second separator 7 produces a gas stream 10 and a liquid stream 11. The gas stream 10 from the second separator 7 should be substantially free from liquid such that the gas stream 10 from the second separator 7 can be used to cool the heat-generating components of the compressor 2 without leading to any of the undesirable effects discussed above.

The second separator 7 may include a horizontal baffle plate 7*a* to isolate the liquid phase from the gas phase. The baffle plate 7*a* has one or more hole(s) to allow liquid to pass through the baffle plate downwardly under gravity and allow gas to pass upwardly. The baffle plate 7*a* is used to ensure effective separation of the liquid and gas phases and reduce mixing of the liquid and gas phases which may occur due to turbulence in the gas phase.

Optionally, one or both of a cooler 8 and a flow regulating valve 9 may be arranged in the supply line 6 upstream of the second separator 7.

Any suitable cooler 8 may be used, for example, the cooler 8 may be an air-cooled or water-cooled heat exchanger which respectively exchange heat with ambient air or water, e.g. sea water. Alternatively, in some environments, the cooler 8 may be coupled to a refrigerant system or may be a thermoelectric cooler. The cooling of the fluid reduces the fluid velocity, increases the wetted surface area and causes additional liquid to condense from the extracted fluid. This improves separation efficiency in the second separator 7. Furthermore, by cooling the fluid to closer to ambient conditions, the system 1 reduces or avoids further temperature drops after the separator 7, which could cause liquid to condense in the gas stream 10.

The flow regulating valve 9 may be used to control the quantity of cooling gas supplied to the heat-generating components of the compressor 2, as using excessive quantities of cooling gas may reduce the efficiency of the compressor 2. The valve 9 will form a restriction and consequently causes a pressure decrease in the extracted fluid when operated to provide less than 100% of the maximum flow rate. This pressure decrease causes a Joule-Thomson cooling effect (e.g. approximately a 0.5° C. temperature drop per bar of pressure decrease). The valve 9 may cause a temperature drop of about 1° C. to 3° C. Thus, the flow regulating valve 9 is preferably located upstream of the second separator 7 such that any liquid condensed by this cooling is removed by the second separator 7. The cooling may additionally improve the separation efficiency of the second separator 7 for the same reasons as cooler 8.

Although in this embodiment the valve 9 is shown positioned downstream of the cooler 8, in an alternative embodiment the valve 9 may be positioned upstream of the cooler 8 in supply line 6.

Notwithstanding the fact that the cooler 8 and the regulating valve 9 provide improvements in separation efficiency of the second separator, they are not essential components. Therefore, in other embodiments the cooler 8 and/or the regulating valve 9 may be absent.

The gas stream 10 from the second separator 7 is passed to cooling gas inlets 26 formed in the housing 20 of the compressor 2 where it is used to cool the heat generating components of the compressor 2.

An optional control valve may be placed in the gas stream 10 to control the flow rate of cooling gas passed to the compressor 2. The optional control valve may be provided in addition to or instead of regulating valve 9, and may provide control similar to that provided by regulating valve 9 over the flow rate of cooling gas passed to the compressor 2. Optionally, neither control valve may be present.

Within the compressor 2, the cooling gas interacts with the heat-generating components of the compressor 2 in a heat exchange relationship. The heat-generating components of the compressor 2 are cooled and consequently the cooling gas is warmed. After cooling the heat-generating components of the compressor 2, the cooling gas exits the housing 20 via cooling gas outlets 27 and a stream 13 of used cooling gas is recirculated to upstream of the compressor 2 and mixed with the gas phase 3. The combined gas is then received by the compressor 2 at the inlet of the compressor 2 and compressed by the compressor 2.

The second separator 7 has a controllable liquid drain valve 14 coupled to the liquid outlet of the second separator 7. The valve 14 may be opened, when required, to fluidly connect the second separator 7 to the gas stream 13. In this way, liquid from the second separator 7 can be injected into the used gas stream 13, and therefore into the gas stream 3 upstream of the compressor 3, so that the gas entering the compressor contains the liquid from the second separator 7.

During normal operation, the liquid drain valve 14 is closed or restricted, causing separated liquid to accumulate within the second separator 7 over time.

To prevent the second separator 7 from overfilling with liquid, the volume of liquid accumulated in the separator 7 is monitored. A float sensor (not shown) may be provided to measure the volume of the liquid within the separator 7. However, it will be appreciate that any suitable method may be used to monitor the liquid level, for example using pressure measurements within the separator or by measuring the liquid and gas levels flowing into and out of the separator 7. When the measured volume reaches or exceeds a predetermined liquid level, the drain valve 14 is opened in a controlled manner to allow a portion of the liquid to exit the second separator 7 and in order to maintain the volume of liquid in the second separator 7 at the predetermined liquid level.

An amount of liquid from the second separator 7 will mix with the gas in the gas stream 3 if the drain valve 14 is not closed completely. However, the volume of liquid entrained in the gas will usually be insufficient to remove deposits from within the compressor 2. By accumulating the liquid within the second compressor 7, a store of liquid can be accessed and used to clean the compressor 2 when necessary. To initiate a cleaning operation of the compressor 2, the liquid drain valve 14 is opened, or opened further, to allow the accumulated liquid to leave the second separator 7 and become entrained in the gas stream 3 entering the compressor 2. During the cleaning operation, the volume of liquid in the second separator 7 reduces as it is supplied to the inlet of the compressor 2. The volume of liquid within this multiphase steam is sufficient so that when it passes through the compressor 2 the liquid within the gas stream 3 acts to remove deposits in the compressor 2.

The flow rate of liquid exiting the second separator 7 through the liquid drain valve 14 may be monitored to ensure that sufficient liquid is being passed to the compressor 2 in order to clean the compressor 2. A float sensor (not shown) may be provided to measure the volume of liquid within the second separator 7 over time. However, any suitable method may be used to monitor the liquid flow rate, for example providing a suitable flow rate measurement device upstream of the liquid drain valve 14 in the liquid stream 11, or by using the flow coefficient of the liquid drain valve 14 to calculate the liquid flow rate.

The accumulated liquid may be sufficient to clean the compressor 2 by itself. However, in some embodiments, an additional supply of cleaning agent, such as glycol, an alcohol, water, and mixtures thereof can be supplied to the second separator 7 via a supply line 15 if the volume of accumulated liquid phase is insufficient to perform cleaning of the compressor 2. The additional supply of cleaning agent preferably comprises a glycol, such as monoethylene glycol (MEG), which may be used elsewhere within the fluid processing system 1, for example as a hydrate inhibitor or desiccant.

Typically, the condition of the gas stream upstream and downstream of the compressor 2 and/or the performance of the compressor 2 are monitored. The condition of the gas (e.g. a wet, liquid-containing gas) may be the flow rate, temperature, pressure and/or composition of the gas stream. The performance of the compressor 2 may be calculated based on the increase in pressure or temperature between the inlet and outlet of the compressor 2. In this example, the monitoring of conditions or performance can be carried out by applying measurement apparatuses (not shown) upstream and downstream of the compressor 2. The measurement apparatuses may each comprises a multiphase flow meter and/or a temperature sensor and/or a pressure sensor. The amount of liquid in the gas stream can determined from flow meter measurements. A change in condition of the gas and/or performance of the compressor 2 may indicate that a deposit has formed on a surface inside the compressor 2. For example, this change may be a drop in pressure of compressed gas downstream of the compressor 2 or a drop in the pressure ratio across the compressor 2. The measured conditions or performance may be compared with previous or expected (modelled) performance.

Detection of fouling may be performed by detecting that the compressor efficiency is reduced compared to the reference value. This is because the compressor's ability to create a pressure increase at a given speed will be reduced by the fouling. This is especially observed on higher volumetric flow rates. If the presence of a deposit on a surface inside the compressor 2 is detected from measured data, the cleaning operation is initiated as described above.

It will be appreciated that fouling will often occur when the liquid in the gas stream is very low, e.g. when liquid is measured in the gas upstream but not downstream of the compressor 2. Gas having a liquid content in an amount of up to around 5% by weight, may result in deposits forming inside the compressor 2. For example, a typical content of liquid of 0.2% to 0.6% by weight may result in a deposit. Thus, in other embodiments, compressor cleaning may be initiated at regular intervals, based on an estimated likelihood of fouling occurring, for example based on a quantity of liquid entering the compressor 2.

In order to provide cleaning, liquid is mixed into the gas of gas stream 13 by opening the liquid drain valve 14, such that the gas stream passed into the compressor 2 comprises gas with an amount of liquid entrained therein. As the gas stream passes through the compressor 2, the gas with liquid contained therein acts to remove the detected deposit. Thus, the gas with liquid acts to clean or wash the internal surfaces of the compressor 2 across which the gas is passed. Such surfaces may be surfaces that define the flow channel of the compressor body that come into contact with the gas. In a rotating compressor, these surfaces may include a rotating blade of one or more of the impellers 22.

In general, it will be appreciated that the amount of liquid required in order to effectively remove deposits from surfaces inside the compressor 2 is dependent on how much liquid evaporates from the gas as it passes through the compressor 2. This is in turn dependent upon the pressure and temperature conditions of the gas.

The amount of liquid injected into the gas stream 3 is preferably sufficiently great that complete vaporization of the liquid does not occur upon passing the gas through the compressor 2. In other words, the gas stream 3 needs to remain as a two-phase mixture, i.e. a gas with liquid entrained therein, as it exits the outlet 2*b* of the compressor 2. If there is insufficient liquid in the gas stream as it enters the compressor 2, the liquid may vaporise away and deposits may form elsewhere inside the compressor 2. The amount of liquid cleaning agent injected is controlled using the drain valve 14. The amount of liquid at the inlet 2*a* and outlet 2*b* of the compressor 2 may be monitored using the measurement apparatuses described above.

Typically, in order to provide effective cleaning, the system 1 is arranged such that the liquid content in the gas stream upstream of the compressor 2 is up to around 20 times greater than the liquid content in normal operating conditions where deposits form. Typically, this may be at least 2 times greater and up to 20 times greater, but higher amounts may also be feasible.

Once the deposit has been removed, the drain valve 14 may be closed or restricted to reduce the liquid content in the gas stream 13 and to cause liquid to again accumulate in the second separator 7. The compressor 2 can continue to perform at previous or improved performance level, e.g. with no or with the original very low amount of liquid contained in the gas.

With the deposit removed, the compressor 2 may perform closer to an ideal level of performance or of compression. The removal of the deposit may be detectable as an increase in performance, or change in the conditions of the gas upstream or downstream of the compressor 2 back to previous values. Alternatively, removal of the deposit may be assumed to be complete after a predetermined period of cleaning operation. Similar cycles of cleaning may be performed as and when further deposit build-up is detected or suspected.

Computer modelling packages are commercially available to allow processing systems 1 such as that shown in FIG. 1 to be modelled. Such packages can be used to determine the amount of liquid required in the gas supplied to the compressor 2 at the inlet for purposes of cleaning. Flow measurements downstream may verify that the amount supplied is sufficient, and that full vaporisation is not occurring. The models may define relationships between parameters for different parts of the system, including relationships between temperature, pressure and liquid content for a given configuration of processing components and fluids.

The preferred embodiment describes a full clean in which the liquid phase is supplied in sufficient quantity such that it remains in a liquid state at the outlet of the gas compressor 2. However, this may not always be necessary and partial cleaning of the gas compressor 2 may sometimes be sufficient. To achieve this, only sufficient liquid phase needs to be added such that it remains in a liquid phase as it passes through the fouled portion of the gas compressor 2. The removed solids which have been displaced will then be carried in the gas stream.

The invention claimed is:

1. A method of cleaning deposited solid material from a fouled portion of a gas compressor whilst the gas compressor is in situ in a gas processing system, the method comprising:

supplying a fluid to an inlet of the gas compressor;

extracting a portion of the fluid from an intermediate stage of the gas compressor, wherein a gas phase of the extracted portion of the fluid is used for cooling within the gas processing system;

accumulating a liquid phase from the extracted portion of the fluid; and supplying the accumulated liquid phase to the inlet of the gas compressor during a cleaning operation so as to remove the deposited solid material from the compressor, wherein the extracted portion of the fluid is supplied to a separator to separate the extracted fluid into the gas phase and the liquid phase, wherein the liquid phase is accumulated in the separator, and wherein the gas phase of the extracted portion of the fluid is used to cool one or more heat generating component(s) of the gas compressor.

2. The method as claimed in claim 1, wherein accumulating the liquid phase comprises restricting a flow of the liquid phase in a liquid outlet of the separator.

3. The method as claimed in claim 2, wherein restricting the flow of the liquid phase comprises at least partially closing a drain valve in the liquid outlet of the separator.

4. The method as claimed in claim 1, wherein supplying the accumulated liquid phase comprises allowing the liquid phase to flow through a liquid outlet of the separator such that a volume of the liquid phase in the separator decreases.

5. The method as claimed in claim 4, wherein supplying the accumulated liquid phase comprises opening a drain valve in the liquid outlet of the separator.

6. The method as claimed in claim 1, further comprising monitoring a volume of the liquid phase accumulated in the separator and draining the liquid accumulated in the separator if a measured volume exceeds a predetermined threshold value.

7. The method as claimed in claim 1, further comprising supplying the gas phase to the inlet of the gas compressor after it has been used to cool the one or more heat generating component(s) of the gas compressor.

8. The method as claimed in claim 7, wherein supplying the accumulated liquid phase to the inlet of the gas compressor comprises mixing the accumulated liquid phase with the gas phase being supplied to the inlet of the gas compressor.

9. A gas processing system, comprising:

a gas compressor including an inlet and an outlet;

a separator configured to receive a fluid extracted from an intermediate stage of the gas compressor and to separate the extracted fluid into a gas phase and a liquid phase, the separator having a gas phase outlet and a liquid phase outlet;

a liquid phase supply line fluidly connecting the liquid phase outlet of the separator to the gas inlet of the gas compressor;

a drain valve arranged in the liquid phase outlet of the separator to control a flow of the liquid phase through the liquid phase supply line, wherein when the drain valve is at least partially closed the liquid phase accumulates in the separator; and a gas phase supply line for supplying the gas phase from the separator to heat generating components of the gas compressor.

10. The gas processing system as claimed in claim 9, further comprising a gas phase return line for supplying gas from the heat generating components of the gas compressor to the inlet of the gas compressor.

11. The gas processing system as claimed in claim 10, wherein the liquid phase supply line is fluidly connected to the gas phase return line for supplying liquid from the separator to the inlet of the gas compressor via the gas phase return line.

12. The gas processing system as claimed in claim 9, further comprising a cleaning fluid supply line for supplying a cleaning fluid to the separator.

13. The gas processing system as claimed in claim 9, wherein the separator comprises a perforated baffle plate to isolate a gas phase from a liquid phase within the separator.

* * * * *